United States Patent [19]

Thurman

[11] Patent Number: 4,594,574
[45] Date of Patent: Jun. 10, 1986

[54] VEHICLE MOTION SIGNALLING SYSTEM
[76] Inventor: John S. Thurman, Rte. 1, Box 9, Hallsboro, N.C. 28442
[21] Appl. No.: 668,282
[22] Filed: Nov. 5, 1984
[51] Int. Cl.⁴ .............................................. B60G 1/26
[52] U.S. Cl. ....................................... 340/71; 340/66; 340/69; 340/94
[58] Field of Search ...................... 340/71, 66, 72, 74, 340/62, 69, 94, 52 F, 70, 82

[56] References Cited
U.S. PATENT DOCUMENTS

| 771,818 | 11/1869 | Kosichek | 340/66 |
| 3,444,514 | 5/1969 | Wang | 340/71 |
| 3,710,315 | 1/1973 | Scherenberg | 340/71 |

Primary Examiner—John W. Caldwell, Sr.
Assistant Examiner—Mahmoud Fatahi-yar
Attorney, Agent, or Firm—William Lawrence Muckelroy

[57] ABSTRACT

The invention relates to a signalling system for vehicles wherein an independent light signal is provided at both the front and rear of a vehicle for a situation wherein the vehicle is both moving and the brakes are being applied or released by the operator of the vehicle. The signal is provided by lights located at the rear and the front of the vehicle which are purple in color, for example. Actuation of the lights is dependent upon two electrical signals, one based on motion of the vehicle and the other based upon actuation of the braking system of the vehicle. The intelligence offered by the signal to an observer is that observation of the purple light indicates that the vehicle is both in motion and that a braking operation is in progress.

7 Claims, 2 Drawing Figures

VEHICLE MOTION SIGNALLING SYSTEM

BACKGROUND OF THE INVENTION

The present invention relates to light signal systems for automobiles and more particularly to a system, electrically powered, which provides a signal when an automobile is in motion and the braking system has been actuated.

A light signalling system for an automobile is a system particularly useful for providing information to observers of the automobile who are also engaged in traffic in the vicinity of the automobile. With such a system these observers and motorists are able to know when the automobile is braking or debraking or in motion. When an automobile, having a signalling means, is either approaching, entering or exiting an intersection and where the actual intention of an operator of the motor vehicle as to direction, braking and motion cannot be ascertained from conventional signalling systems, the improved signalling system provides additional intelligence to observers which substantially decreases the probability of a collision due to an observer mis-anticipating the operator.

The present automobile signalling systems provide signalling based usually on one factor, for example, the condition of the braking system. Such signalling is effected by an energized red light directed rearwardly of the automobile. Since a rearwardly directed red light is normally lighted when the automobile light system is energized, a change in the braking condition under these circumstances is shown only by a change of intensity of said light. This arrangement is unsatisfactory and additional information is needed to provide a greater margin of safety for the observers of such a vehicle who are also engaged in traffic with the vehicle. Change in intensity can easily be overlooked. This results in a hazardous situation.

Other inventions such as the vehicle motion signalling system by Yang Wang in U.S. Pat. No. 3,444,514 have provided two rearwardly directed signalling lights of different colors so that a change in braking condition, even at night, results in a signal indication which is more readily discernable. The Yang Wang system utilizes more than one factor for signalling. It utilizes the condition of the automobile braking system or another factor, the presence or absence of automobile motion. However, the Yang Wang system signals the presence or absence of motion independently of the braking factor and, therefore, does not distinguish between the application of the brake when the vehicle is not in motion from the situation where the vehicle is in motion and the brake is being applied.

An object of the present system is to provide a light signalling means to indicate to an observer the condition of the vehicle being in motion and that the brakes are being actuated by the operator. The light for indicating this particular condition is independent of present brake lights utilized on conventional vehicles and is in addition to indicator means envisioned by the Yang Wang system described above.

Various other objects of the invention will become apparent from the following description when read in conjunction with the accompanying drawings.

SUMMARY OF THE INVENTION

In a standardly manufactured vehicle, a vehicle motion signalling system is provided whereby signal lights, located at the front and rear of the vehicle which are purple in color, for example, are caused to light up whenever the vehicle brake is actuated and, at the same time, the vehicle is moving whereby greater safety is provided for the occupant of the vehicle as well as occupants of other vehicles engaged in nearby traffic.

BRIEF DESCRIPTION OF THE DRAWINGS

The novel invention may be more fully understood by reference to the foregoing specification and drawings, to wit.

DESCRIPTION OF THE PREFERRED EMBODIMENT

Figure 1:
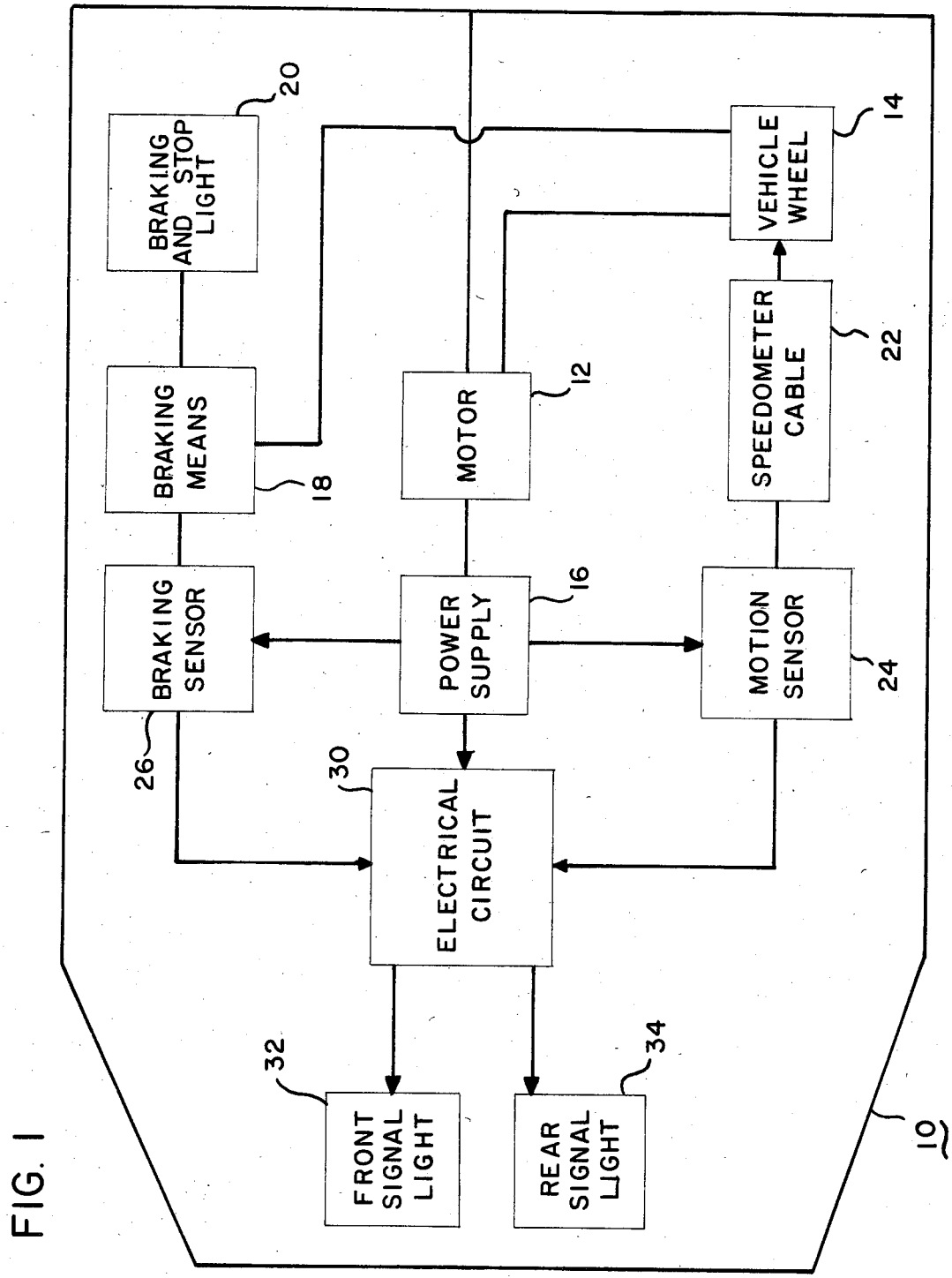
FIG. 1 is a block diagram showing the component parts of the novel invention and the manner in which they are interconnected; and, FIG. 2 is a pictorial block diagram of a motion sensor and a braking sensor shown in conjunction with a block diagram of the electrical circuit of the invention.

In FIG. 1 there is disclosed, in block diagram form, the preferred elements of the invention and the manner in which they are interconnected. Shown there is a vehicle 10 having connected thereto by conventional known means a motor 12 which may be gasoline powered, for example. The motor 12 is connected to at least one vehicle wheel 14 by standard state of the art differential and coupling means, for example. The motor 12 is also connected to a power supply 16. The power supply 16 comprises a standard motor vehicle battery, standard generator, and a standard automobile engine starter, for example. The motor 12 is also connected via at least a vehicle wheel 14 to a braking means 18 in a standard fashion representative of that of the state of the art today. The braking means 18 is shown connected to the vehicle wheel 14. The connection of the braking means 18 to the vehicle wheel 14 is by standard, state of the art, commonly known mechanical means. Shown connected to the braking means, is a combination braking and stop light 20. Also shown in FIG. 1 is a speedometer cable 22 which is conventional, state of the art and coupled to the vehicle wheel 14 by standard commonly known means.

The speedometer cable 22 is connected to a motion sensor 24. The motion sensor 24 senses any movement of the speedometer cable 22. The motion sensor 24 is electromechanical in nature and provides an electrical signal output or conversion of any mechanical movement or rotation of the speedometer cable utilizing Lenz's law in a manner which will be described in further detail below.

There is shown in FIG. 1 an electrical sensor means such as a braking sensor 26, for example, interconnected to the power supply 16 and to a circuit means such as electrical circuit 30, for example. The motion sensor 24 is also connected to the electrical circuit 30.

The motion signalling system of the invention, shown in block diagram form in FIG. 1, also comprises at least one front signal light 32 connected to the electrical circuit 30 and at least one rear signal light 34 also connected to the electrical circuit 30.

Figure 2:
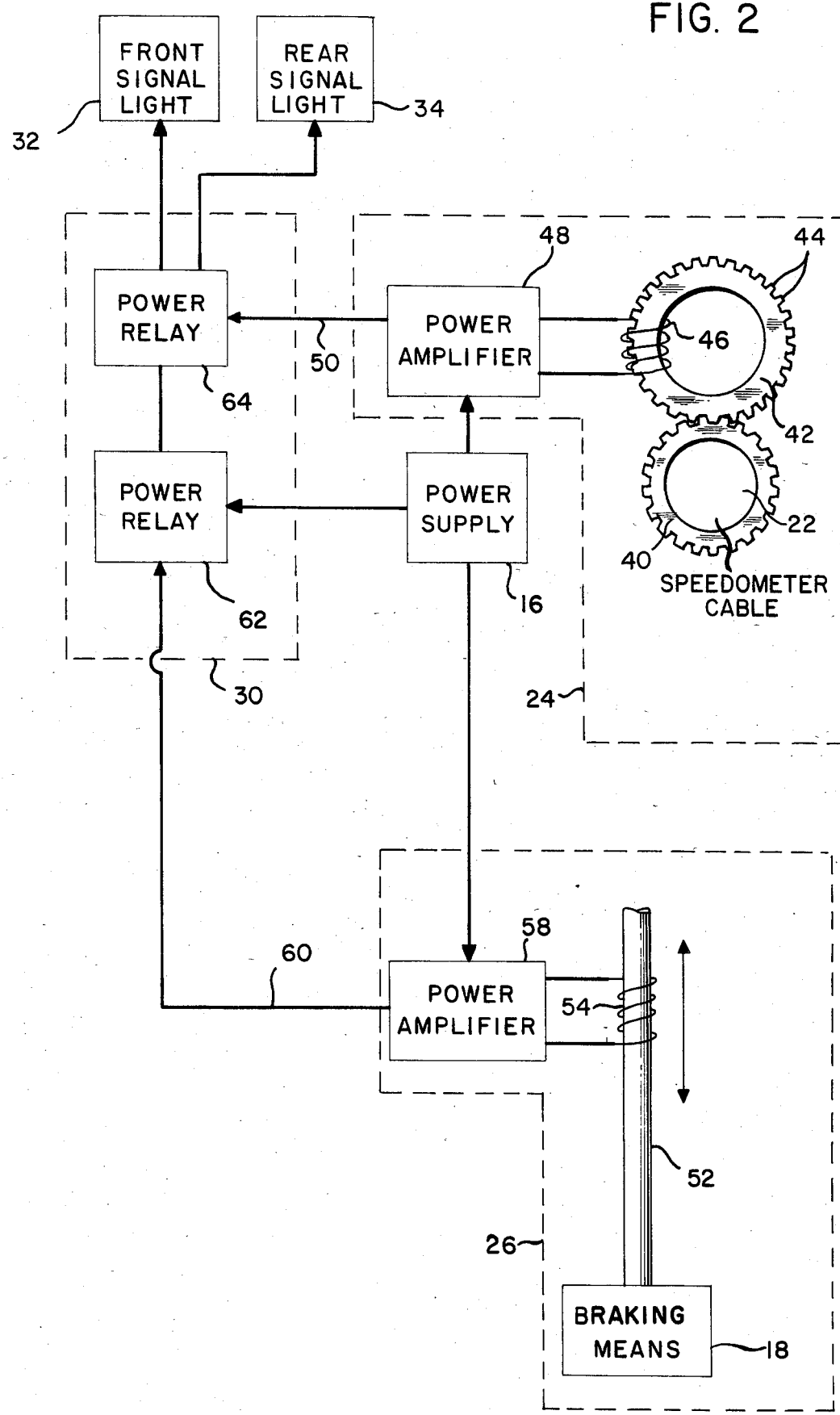

The improved vehicle motion signalling system, shown in FIG. 1, operates in the following manner. With the vehicle 10 in motion the vehicle wheel 14 rotates and, in turn, causes the speedometer cable 22, as illustrated in FIG. 2, to move. Movement of the speedometer cable 22 is detected by the motion sensor 24 which, in turn, provides an electrical signal to the electrical circuit 30 via conduit 50. Power for the electrical signal from the motion sensor 24 is channeled to the electrical circuit 30 via conduit 50 from the power supply 16. If an electrical signal is also generated by the braking sensor 26 and channeled to the electrical circuit 30, the electrical circuit 30 then provides an output electrical signal to the front signal light 32 and the rear signal light 34 such that the lights 32 and 34 are turned on. When the lights 32 and 34 are turned on by the electrical circuit 30, intelligence is provided to observers of the lights 32 and 34 to indicate the conjunctive of the brake being actuated or deactuated and the vehicle 10 being in motion.

One novel and distinct aspect of this invention is that the front signal light 32 and the rear signal light 34 are specifically selected to be purple in color to distinguish over the present colors used on vehicles produced today. The distinctive purple color of these two lights provides an unequivocal indication to an observer engaged in traffic with the vehicle 10, that the vehicle 10 is in motion and that a braking action, either in the form of braking or debraking, is occurring.

The electrical circuit 30 functions as a power gate. The electrical circuit 30 provides zero output to the front signal light 32 and the rear signal light 34 if it receives a signal from either the braking sensor 26 or the motion sensor 24 or no signal. However, when the electrical circuit 30 receives a signal simultaneously from the braking sensor 26 and from the motion sensor 24, a specific electrical signal is channeled sufficient to either turn on the front signal light 32 and the rear signal light 34 or to cause them to blink at a pre-selected frequency. Blinking of the signal lights 32 and 34 is determined or caused by the addition of a chopper circuit into the electrical circuit 30 such that the signal normally generated by the electrical circuit 30 is interrupted at a fixed frequency low enough to provide a visual observation of the blinking of the front signal light 32 and the rear signal light 34. Each signal light is first in an on state then subsequently in an off state then again in an on state and so on much in the same fashion as present day, state of the art, turn signals.

FIG. 2 shows, in greater detail, the motion sensor 24, the braking sensor 26 and the electrical circuit 30.

In FIG. 2, the motion sensor 24 is shown in conjunction with the speedometer cable 22. Connected to the speedometer cable 22 is a gear 40. The gear 40 is adapted to engage a ferromagnetic toroid 42 having teeth 44 adapted to be engaged by the gear 40. Movement of the gear 40, by rotation of the speedometer cable 22, causes the toroid 42 to rotate. Situated around the toroid 42 is an inductor 46. Movement of the toroid 42 causes an electrical current to be generated in the inductor 46 which is transmitted by an interconnection of the coil 46 to a power amplifier 48. The power amplifier 48 amplifies the electrical current generated in the coil 46. Power is supplied to the power amplifier 48 from the power supply 16. The power amplifier 48 provides an output signal along the interconnection 50 to the electrical circuit 30.

The braking sensor 26 is also illustrated in FIG. 2 in conjunction with the braking means 18 shown therein in block diagram form. The braking means 18 is a standard foot actuated brake, such as is commonly known in the art and in use today in automobiles which travel on the highway. Connected to the braking means 18 is a ferromagnetic rod 52, cylindrical in shape, for example. The rod 52 is connected to the braking means 18 by conventional mechanical link up. Movement of the braking means 18 via a braking pedal (not shown) in either direction will cause the rod 52 to move inside of a second inductance coil 54 such that an electrical current is generated in the coil 54. The coil 54 is connected to a second power amplifier 58. The power amplifier 58 amplifies the electrical current generated by the coil 54 upon movement of the rod 52. The power amplifier 58 is also powered by the power supply 16. The power amplifier 58 provides an output electrical signal or current along the conduit 60 to the electrical circuit 30.

There is shown in FIG. 2 the electrical circuit 30 comprising a first power relay 62 connected to a second power relay 64. The output through the conduit 60 from the power amplifier 58 is fed into the power relay 62 which also is powered by the power supply 16. The power supply 16 is also connected via power relay 62 to the power relay 64. The power relays 62 and 64 may be of the electrical type such as manufactured by Potter and Brumfield normally opened relays, for example. The power relay 62 channels power from the power supply 16 to the power relay 64 by in response to an electrical signal through the conduit 60 interconnected between the power amplifier 58 and the power relay 62. Since the power relay 64 is normally open, electrical power is only transmitted by the power relay 64 to the front signal light 32 and the rear signal light 34 when there is an electrical signal transmitted through the conduit 50 from the power amplifier 48 and power is also simultaneously transmitted via conduit 60.

In operation, signals from both power amplifier 48 and the power amplifier 58 are needed to cause the power relays 62 and 64 to close and transmit power to the front and rear signal lights 32 and 34, respectively. The front and rear signal lights 32 and 34 have been selected to be purple in color by the inventor to provide a clear indication of the intelligence offered by this signalling system to an observer engaged in traffic with the vehicle. However, it is within the scope of this invention to use other colors for the signal lights heretofore mentioned and other equivalent modes or versions of this invention may become apparent from a reading of this specification of the preferred embodiment. Having fully described this invention and its mode of operation, the following claims are hereby set forth:

I claim:

1. In combination with a vehicle having a moter, a braking means controlled by operator actuation of a brake, a braking and stop combination light, said vehicle also having a plurality of wheels with at least one of said wheels being connected to said braking means and to a speedometer cable and said vehicle also having an electricity generator connected to said motor and powered by said moter, the improvement comprising:

at least a first signal light located at the front of said vehicle and at least a second signal light located at the rear of said vehicle, an electrical circuit means connected to each said signal light and responsive for actuation of each said signal light, a motion sensor means, connected to at least one of said wheels via said speedometer cable and to said electrical circuit means, for sensing when said wheel is moving and simultaneously providing a first electrical signal output to said electrical circuit means, a braking sensor means for sensing actuation of said braking means and providing a second electrical signal output to said circuit means, said circuit means further comprising means for simultaneously directing electrical power to each of said signal lights upon actuation by a combination of the electrical signal output from said motion sensor means and the electrical signal output from said braking sensor means, said means for directing electrical power to each of said signal lights comprising a first power relay adapted to receive said electrical signal output from said motion sensor means, said first power relay being interconnected between said signal lights and said motion sensor means, said first power relay being actuated by an electrical signal from a second power relay, said second power relay being interconnected between said first power relay and said braking sensor means, said second power relay having an independent power supply comprising said electricity generator.

2. The combination of claim 1 wherein said first and second signal lights are purple.

3. The combination of claim 1 further comprises a first power amplifier adapted to receive said first electrical signal output and provide a first power amplifier output signal, said first power relay being adapted to receive the first power amplifier output signal.

4. The combination of claim 3 further comprises a second power amplifier adapted to receive said second electrical signal output and provide a second power amplifier output signal, said second power relay being adapted to receive said second power amplifier output signal, said first power relay being connected to said second power relay whereby a first power relay output signal relays amplified power from both sensor means sufficient to turn on said first and second signal lights.

5. The combination of claim 4 wherein said motion sensor means comprises a ferromagnetic toroid connected to teeth about its outer periphery and a gear attached to said speedometer cable, said gear being adapted and connected to rotate in conjunction with said speedometer cable, said toroid being adapted to rotably engage said gear.

6. The combination of claim 5 wherein said motion sensor means comprises a first inductor through which said ferromagnetic toroid rotates.

7. The combination of claim 5 wherein said braking sensor means comprises a ferromagnetic rod connected to said brake and oriented such that any movement of said brake commensurately moves said rod, and a second inductor oriented around said rod whereby any movement of said rod generates an electrical signal in said second inductor.

* * * * *